March 7, 1961 W. PAPKE 2,974,200

CIRCUIT ARRANGEMENT FOR IDENTIFYING CALLING TELEPHONE PARTY LINE STATIONS

Filed July 14, 1959 2 Sheets-Sheet 1

Inventor:
Wolfgang Papke.
By [signature] Atty

March 7, 1961 W. PAPKE 2,974,200

CIRCUIT ARRANGEMENT FOR IDENTIFYING CALLING TELEPHONE PARTY LINE STATIONS

Filed July 14, 1959

2 Sheets-Sheet 2

Inventor.
Wolfgang Papke.
By [signature] Atty.

United States Patent Office 2,974,200

Patented Mar. 7, 1961

2,974,200

CIRCUIT ARRANGEMENT FOR IDENTIFYING CALLING TELEPHONE PARTY LINE STATIONS

Wolfgang Papke, Munich, Germany, assignor to Siemens und Halske Aktiengesellschaft Berlin and Munich, a corporation of Germany

Filed July 14, 1959, Ser. No. 826,993

Claims priority, application Germany Aug. 11, 1958

2 Claims. (Cl. 179—17)

Figure 1:
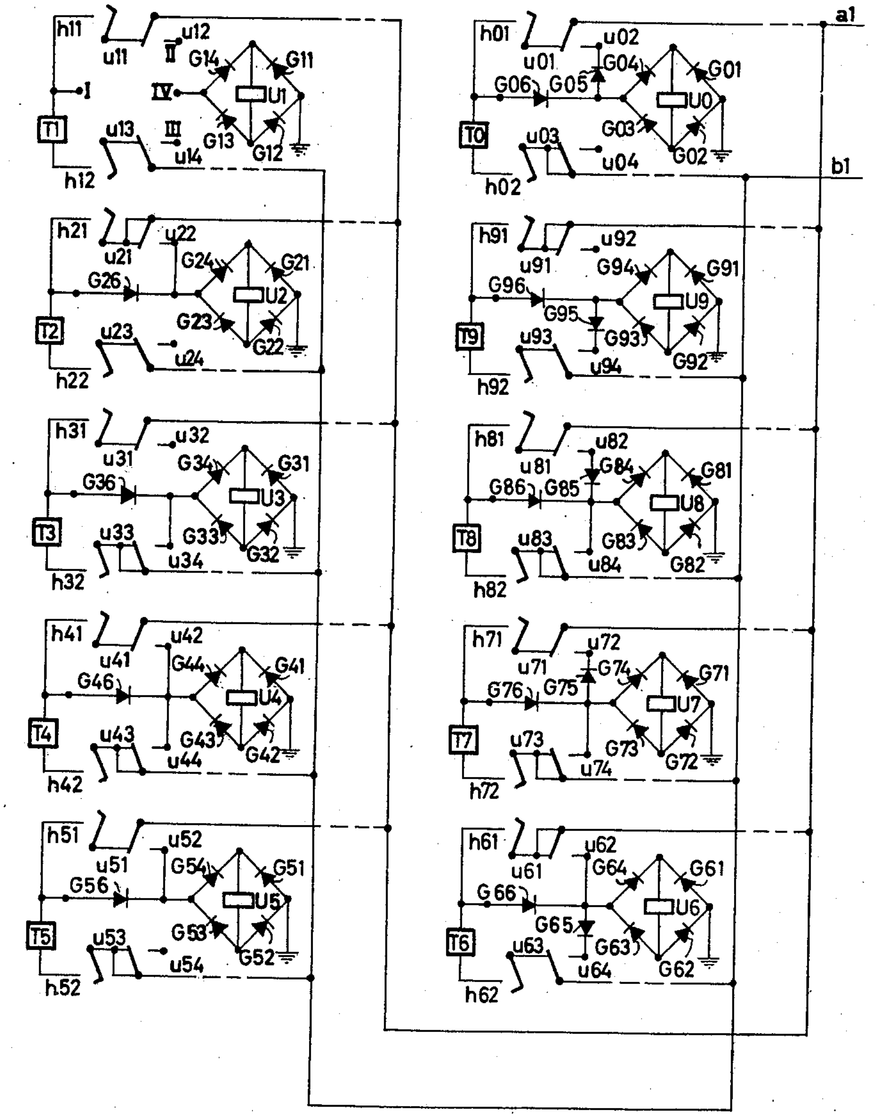

This invention is concerned with a circuit arrangement for identifying calling party line stations in communication systems and especially in telephone systems.

There are arrangements known for identifying calling party line stations wherein particular marker or identification impulses are transmitted by way of auxiliary mechanical devices respectively cooperatively associated with the dials at subscriber stations. The number of subscriber stations that can thereby be identified is relatively small since the time available for the transmission of the identifying impulses is limited to the interval during which no selection impulse series or digits are transmitted incident to the rotation of a dial from a given set position to the home position thereof. The corresponding relatively short available interval is moreover further limited by switching operations that must be executed in the exchange so as to switch circuits from the devices which receive the selection impulse series to the devices serving for the identifying operations. The number of definitely identifiable party line stations therefore can in the known arrangements generally hardly exceed five stations.

In other known arrangements, the identification is effected by means of generators constructed, for example, of transistors and located at the subscriber stations. To each subscriber station is allocated a generator frequency. The requirements so far as frequency stability of the generators and freedom from harmonics are concerned, and further, so far as the sensitivity of the evaluation switching means is concerned, can be met only with great circuitry expenditure, since the frequency spacing of the generators must be relatively slight in view of the band widths that can be transmitted.

The present invention avoids the disadvantages of prior arrangements by the provision of control relays respectively located at and individual to the subscriber stations, such relays being upon initiation of the identification operatively affected by exchange devices for the purpose of closing at a given subscriber station a marking circuit extending by way of the line conductors, evaluation relays being disposed at the exchange which are controlled over such marking circuits to identify the subscriber involved in the corresponding call.

The control relays allotted to the subscriber stations, which close marking circuits extending over the respective line conductors, eliminate the need for auxiliary conductors otherwise required for the identification. The invention accordingly constitutes an advance over arrangements in which such auxiliary conductors are used.

The control relays need be equipped with only few contacts for controlling the corresponding marking circuits, so that miniature relays can be employed which can be accommodated in any station housing. The identification accordingly does not require auxiliary control boxes or the like.

In accordance with a further object and feature of the invention, only the control relay allotted to a subscriber station engaged in a call will become operatively effective in the identification. It is, however, feasible that the control relays of all stations are operatively connected and that the operative closure of a marking circuit at a subscriber station is made dependent upon the condition or presence of a call.

The control relays respectively allotted to the subscriber stations are respectively connected between ground and one of the line conductors by way of a rectifier bridge and will accordingly be held even responsive to a change of direction of the current on the line.

The various objects and features of the invention will be brought out in the course of the description of an embodiment which will be rendered below with reference to the accompanying drawings. In the drawings, Fig. 1 shows a party line with the various subscriber stations connected thereto and also the control relays respectively allotted to the various stations; and Fig. 2 illustrates in schematic manner exchange equipment.

In accordance with Fig. 1, each subscriber station T1 to T0 is provided with a control or marking relay as indicated respectively at U1 to U0. Contacts indicated by the letter *h* with a numerical suffix are closed when a subscriber removes his receiver to initiate a call. Such subscriber is thereby connected to the line conductors *a*1 and *b*1.

Figure 2:
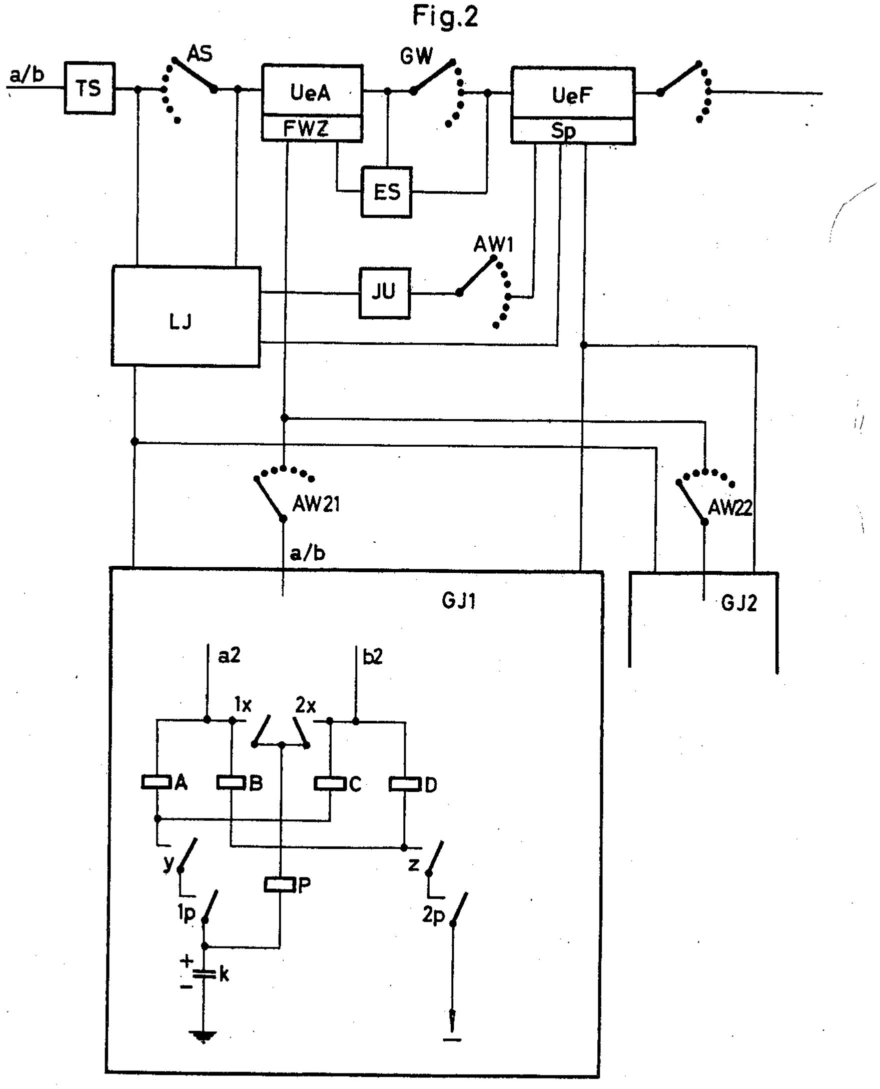

Fig. 2 shows as an example an overall view of a system to which the party line may be connected. Upon removal of the receiver at a subscriber station, and provided the party line is idle, a circuit will be closed extending to the line circuit TS. The call finder AS establishes connection with the party line and extends the call to an impulse repeater or transmission device U*e*A which receives the impulse series transmitted from the corresponding subscriber station responsive to operation of the subscriber dial. Cooperatively associated with the repeater U*e*A is a toll or long distance selection control device FWZ comprising a switch which becomes operative to ascertain whether the calling party on the party line desires to extend a long distance call. Upon ascertaining the presence of a digit signifying a long distance call, a setting set ES becomes operative to cause the group selector GW, which is fixedly coupled with the repeater U*e*A, to set its wipers in engagement with an idle long distance repeater U*e*F. A storage device S*p* cooperatively associated with this repeater U*e*F seizes an idle bank contact identifier LJ which identifies the bank contacts engaged by the call finder as belonging to a party line. The storage device S*p* is caused by means of an impulse converter JU and an interconnecting switch AW1, to connect with an idle party line idle identifier GJ. This last named identifier is thereupon connected, by means of an interconnecting switch respectively indicated at AW21 and AW22, with the long distance selection control device FWZ. Assuming the party line identifier GJ1 to be idle, it will be connected with the long distance selection control device FWZ by means of the interconnecting switch AW21.

The essential details of a party line identifier such as GJ1 include in addition to a plurality of evaluation relays A, B, C, D, a test relay P and control contacts *x*, *y*, *z*. These control contacts are successively actuated, for example, by a timer or mechanically by means of cams (not shown). The test relay P is first connected, by means of the control contacts 1*x*, 2*x*, to the conductors *a*2, *b*2, and therewith to the line conductors *a*1, *b*1 (Fig. 1) of the party line. The test relay P is connected in series with a capacitor K which had been charged prior to the actuation of contacts 1*x*, 2*x*, for example, by way of break contacts corresponding to contacts 1*x*, 2*x*. A discharge circuit for the capacitor K is closed upon connection of test relay P to the conductors $a2$, $b2$. Assuming that the call was initiated at the party line station T7, the capacitor K will be connected in the discharge circuit (1) Positive plate of capacitor K (Fig. 2), P,
$1x$, $a2$, . . . $a1$ (Fig. 1) . . . $u71$, $h71$
$2x$, $b2$, . . . $b1$ (Fig. 1) . . . ($u73$), h72, T7
G76, G74, U7, G72, ground, . . . negative plate of the capacitor K (Fig. 2).

Test relay P and control relay U7 energize. Relay P connects itself in a holding circuit and closes its contacts $1p$, $2p$, thereby preparing circuits for the evaluation relays A to D. Relay U7 opens its contacts $u71$, $u73$ and closes its contacts $u72$, $u74$. Marking circuits are now closed by way of the contacts $u72$ and $u74$. While the marking circuit extending by way of contact $u74$ can be traversed by current in both directions, the circuit over contact $u72$ has a rectifier G74 disposed therein.

The marking circuits become successively operable after opening of contacts $1x$, $2x$, upon closure of contacts $y$ and $z$. Contact $y$ is closed first. Relay C is now operatively connected in the circuit (2) Positive plate of capacitor K (Fig. 2), $1p$, $y$, C, $b2$, . . . $b1$ (Fig. 1) . . . $u74$, G74, U7, G72, ground . . . negative plate of capacitor K (Fig. 2).

Relay C places itself in a holding circuit, and contact $y$ opens while contact $z$ closes. The evalution relays B and D are operatively connected in the circuit (3) (Fig. 2), $2p$, $z$,
B, $a2$ . . . $a1$ (Fig. 1) . . . $u72$, $G74$
D, $b2$ . . . $b1$ (Fig. 1) . . . $u74$
G73, U7, G71, ground.

Relays B and D energize, each closing a holding circuit for itself. Relay U is disconnected upon opening of contact $z$. The identification is completed and the results thereof are marked by relays B, C and D.

As indicated in Fig. 1, each station is provided with terminal points such as indicated in connection with station T1 at I to III, which can be interconnected in different manner with point IV either directly or by way of rectifier means. The control relays U1 to U0 are respectively energized responsive to closure of contacts $1x$ and $2x$ (Fig. 2) by way of corresponding connections extending between the points I and IV. At the subscriber stations T2 to T0 there are disposed in the respective connections rectifiers such as G26 to G06, any operatively actuated control relay U2 to U0 being held actuated by way of the corresponding rectifier.

The break contact of the respective control relay U which is disposed in one of the line conductors is bridged in each subscriber station in order to maintain a holding circuit for the respective control relay U until operative actuation of the contacts $y$ and $z$ (Fig. 2). The corresponding break contacts could be omitted; however, these contacts have been included despite the fact that they are inactivated, so as to represent all station circuits uniformly. Some of the contact points which are not operatively utilized, for example, the contact points $u24$, $u32$, $u54$, $u92$, $u04$, may also be omitted. In the stations T2, T3, T4, T6, T7 and T8, the respective rectifier G26, G36, G46, G66, G67, G68 are upon closure of the corresponding contacts $u$ short circuited, each by a polarized connection extending between the points II and III and IV, respectively. They are, accordingly, ineffective for the evalution and could likewise be omitted by providing direct connections between the corresponding points I and IV.

All wiring between the points I to IV can be omitted in one single subscriber station, as is assumed to be the case in connection with station T1. Since neither the relay P nor one of the relays A to D (Fig. 2) can be operatively actuated in such case, there will be obtained a negative identification result. In the event that a positive result should be required in a given installation, a combination may be used for the subscriber station T1, additionally to those already utilized combinations which are to be marked by the relays A to D, and the points I to IV may for this purpose be correspondingly wired. It is, for example, possible to interconnect the points I and IV by a rectifier polarized in accordance with the polarization of rectifier G26, to connect the points III and IV by way of a rectifier polarized opposite to the polarization of rectifier G65 of the station T6, and to bridge the contact $u11$ in the manner of the bridging applied to contact $u21$. This last noted combination is assumed to be present in connection with a station T1′, included in the following table, indicating the evaluation relays which become operatively effective in connection with the individual stations.

| Subscriber Station | Energized Evaluation Relays | | | |
|---|---|---|---|---|
| T1 | ------ | ------ | ------ | ------ |
| T1′ | A | ------ | C | ------ |
| T2 | A | B | ------ | ------ |
| T3 | ------ | ------ | C | D |
| T4 | A | B | C | D |
| T5 | A | B | C | ------ |
| T6 | A | B | ------ | C |
| T7 | ------ | B | C | D |
| T8 | A | ------ | C | D |
| T9 | A | ------ | ------ | D |
| T0 | ------ | B | C | ------ |

Decisive for the energization or operative actuation of the relay A is always a direct connection between the points II and IV or a connection between these points by way of a rectifier which is polarized according to rectifier G85, or a connection between the points I and IV corresponding to the rectifier G96, the latter case requiring that the break contact disposed in the line conductor $a1$ be bridged. Corresponding requirements apply for the relay C and the points III and IV and I and IV, respectively. Decisive for the energization or operative actuation of relay B is a direct connection between the points II and IV or a connection of these points by way of a rectifier, polarized according to rectifier G05, and corresponding requirements apply again for the relay D and the points III and IV.

In place of the capacitor as a current source, there may be used a correspondingly polarized battery. It is likewise feasible to provide for all the relays A to D a common alternating current source and to connect ahead of the respective relays correspondingly polarized rectifier means. In case the subscriber station T1 is circuited to provide for the actuation of the relays as indicated in the table in connection with station T1′, the relay P (Fig. 2) may be omitted and, in such a case, when using an alternating current source for all relays, only two connecting contacts will be required in place of the contacts $1x$, $2x$, $y$ and $z$.

Changes may be made within the scope and spirit of the appended claims which define what is believed to be new and desired to have protected by Letters Patent.

I claim:

1. A circuit arrangement for identifying telephone party line stations, comprising a party line having a plurality of stations connected thereto and having line conductors extending to an exchange, a control relay disposed at each station and being individual thereto, rectifier bridge means for cooperation with each of said control relays, circuit means for connecting the respective control relays and the rectifier bridge means respectively cooperating therewith between ground potential and at least one of said line conductors, evaluation relay means at the exchange, circuit means at the exchange operative upon initiation of the identification for causing operative actuation of the control relay of a party line station involved in a call, the operative actuation of such control relay being effective to close a marking circuit extending by way of said line conductors for operatively affecting said evaluation relay means in a combination which is characteristic of the station involved in the call for the purpose of marking such station correspondingly.

2. A circuit arrangement for identifying telephone party line stations, comprising a party line having a plurality of stations connected thereto and having line conductors extending to an exchange, a control relay disposed at each station and being individual thereto, rectifier bridge means for cooperation with each of said control relays, circuit means for connecting the respective control relays and the rectifier bridge means respectively cooperating therewith between ground potential and at least one of said line conductors, evaluation relay means at the exchange, said evaluation relay means comprising a plurality of evaluation relays and a test relay, circuit means operative upon initiation of the identification for connecting the control relay of a party line station involved in a call and the rectifier bridge means respectively cooperating therewith in series with said test relay so as to effect operative actuation of such control relay and said test relay, circuit means governed by said test relay upon actuation thereof for controlling the connection of said evaluation relays to said line conductors, said evaluation relays being thereupon operative in a combination which is characteristic of the station involved in the call for the purpose of marking such station correspondingly.

References Cited in the file of this patent

UNITED STATES PATENTS

| | | |
|---|---|---|
| 2,717,279 | Matlack et al. | Sept. 6, 1955 |
| 2,794,859 | Abbott et al. | June 4, 1957 |
| 2,806,091 | Lewis | Sept. 10, 1957 |